United States Patent
Kang

(10) Patent No.: US 8,304,107 B2
(45) Date of Patent: Nov. 6, 2012

(54) CYLINDRICAL LITHIUM RECHARGEABLE BATTERY

(75) Inventor: Shin Gun Kang, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1177 days.

(21) Appl. No.: 11/374,115

(22) Filed: Mar. 14, 2006

(65) Prior Publication Data

US 2006/0216587 A1 Sep. 28, 2006

(30) Foreign Application Priority Data

Mar. 24, 2005 (KR) .................. 10-2005-0024664

(51) Int. Cl.
  *H01M 2/02* (2006.01)
  *H01M 2/08* (2006.01)
  *H01M 4/00* (2006.01)
  *H01M 6/08* (2006.01)
  *H01M 6/10* (2006.01)
  *H01M 10/34* (2006.01)
  *H01M 10/52* (2006.01)

(52) U.S. Cl. ............. 429/164; 429/57; 429/94; 429/174

(58) Field of Classification Search .................. 429/163, 429/53, 57, 94, 164, 174
See application file for complete search history.

(56) References Cited

U.S. PATENT DOCUMENTS

| | | | | |
|---|---|---|---|---|
| 5,053,297 A | * | 10/1991 | Yamahira et al. | 429/231.3 |
| 6,020,084 A | * | 2/2000 | Romero et al. | 429/94 |
| 2003/0198863 A1 | * | 10/2003 | Murashige et al. | 429/53 |
| 2004/0029012 A1 | * | 2/2004 | Tanizaki et al. | 429/231.95 |
| 2005/0008930 A1 | * | 1/2005 | Johnson et al. | 429/94 |
| 2006/0063063 A1 | * | 3/2006 | Mori et al. | 429/53 |

FOREIGN PATENT DOCUMENTS

| | | |
|---|---|---|
| CN | 1423361 | 6/2003 |
| CN | 1487968 | 4/2004 |
| JP | 06-187958 | 7/1994 |
| JP | 06-187959 | 7/1994 |
| JP | 08-250155 | 9/1996 |
| JP | 11-204140 | 7/1999 |
| JP | 2000-164257 | 6/2000 |
| JP | 2001-126769 | 5/2001 |
| JP | 2003-022791 | 1/2003 |
| JP | 2003-308873 | 10/2003 |
| KR | 1020040110600 | 12/2004 |

OTHER PUBLICATIONS

Fink, Johannes K., High Performance Polymers, 2008, William Andrew Publishing, pp. 489-491.*
Machine Translation of JP 11204140 A; Jul. 1999; Ochita et al.*
Machine Translation of JP 08250155 A; Sep. 1996; Tagawa.*
Ochita et al., Human translation of JP 11204140 A, Jul. 1999.*
Tagawa, Human translation of JP 08250155 A, Sep. 1996.*

* cited by examiner

*Primary Examiner* — Basia Ridley
*Assistant Examiner* — Sean P Cullen
(74) *Attorney, Agent, or Firm* — H.C. Park & Associates, PLC

(57) ABSTRACT

A cylindrical lithium rechargeable battery includes a core member made of a material that is softer than steel use stainless and has specific gravity lower than that of steel use stainless. The core member may prevent deformation and breakage of a cap assembly.

8 Claims, 10 Drawing Sheets

CYLINDRICAL LITHIUM RECHARGEABLE BATTERY

CROSS REFERENCE TO RELATED APPLICATION

This application claims priority to and the benefit of Korean Patent Application No. 10-2005-0024664, filed on Mar. 24, 2005, which is hereby incorporated by reference for all purposes as if fully set forth herein.

BACKGROUND OF THE INVENTION

1. Field of the Invention

The present invention relates to a cylindrical lithium rechargeable battery, and more particularly, to a cylindrical lithium rechargeable battery that may prevent deformation and breakage of a cap assembly.

2. Discussion of the Background

As generally known in the art, a cylindrical lithium rechargeable battery may include an electrode assembly wound in the form of a cylinder, a cylindrical can for receiving the electrode assembly therein, an electrolyte contained in the cylindrical can to enable lithium ions to move, and a cap assembly coupled with the cylindrical can to prevent the electrolyte from leaking and to prevent the electrode assembly from separating from the cylindrical can.

This type of cylindrical lithium rechargeable battery may have a capacity of about 2.000 to 2,400 mA, and thus may be used for applications that require a large power capacity, such as for a notebook PC, a digital camera, or a camcorder. A plurality of cylindrical lithium ion rechargeable batteries may be coupled with each other in a row or in series and assembled with a protection circuit in the form of a hard pack to be used as a power source for electronic appliances.

A cylindrical lithium rechargeable battery may be fabricated as described below. First, an electrode assembly may be prepared by sequentially stacking a negative electrode plate coated with an active material, a separator, and a positive electrode plate coated with an active material, and then winding the negative electrode plate, the separator, and the positive electrode plate in the form of a cylinder. End portions of the negative electrode plate, the separator, and the positive electrode plate may be coupled to a rod-type winding shaft. The cylindrical electrode assembly may be accommodated in a cylindrical case and an electrolyte may be injected into the cylindrical case. Then, the cap assembly may be welded to an upper portion of the cylindrical case to complete the cylindrical lithium rechargeable battery.

A core member in the form of a rod may be inserted into the center portion of the electrode assembly to prevent the electrode assembly from deforming during charging and discharging of the cylindrical lithium ion rechargeable battery.

However, a core member provided in a conventional cylindrical lithium rechargeable battery may easily move if an external impact is applied to the cylindrical lithium rechargeable battery, such as when the battery falls to the ground. If the core member moves within the electrode assembly, the cap assembly provided on the upper portion of the electrode assembly may be damaged. If the core member collides with a safety vent, the safety vent may be inversely deformed or broken, which may degrade the safety of the cylindrical lithium ion rechargeable battery.

SUMMARY OF THE INVENTION

This invention provides a cylindrical lithium rechargeable battery that includes a core member made of a material that is softer than steel use stainless (SUS) and has a specific gravity lower than that of SUS.

Additional features of the invention will be set forth in the description which follows, and in part will be apparent from the description, or may be learned by practice of the invention.

The present invention discloses a cylindrical lithium rechargeable battery, including an electrode assembly including a first electrode plate, a second electrode plate and a separator arranged between the first electrode plate and the second electrode plate, the electrode assembly arranged to form a cavity at a center portion of the electrode assembly; a core member in the shape of a rod and made of a material that is softer than steel use stainless and that has a specific gravity lower than that of steel use stainless, the core member arranged inside the cavity of the electrode assembly; a case in which the electrode assembly and the core member are arranged, the case comprising an opening arranged at an upper portion of the case; and a cap assembly coupled with an upper portion of the case, the cap assembly sealing the case.

The present invention also discloses a cylindrical lithium rechargeable battery including an electrode assembly including a first electrode plate, a second electrode plate, and a separator arranged between the first electrode plate and the second electrode plate, the electrode assembly arranged to form a cavity at a center portion of the electrode assembly; a core member comprising a plurality of wing sections, the core member arranged inside the cavity of the electrode assembly; a case in which the electrode assembly and the core member are arranged, the case comprising an opening arranged at an upper portion of the case; and a cap assembly coupled with an upper portion of the case, the cap assembly sealing the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
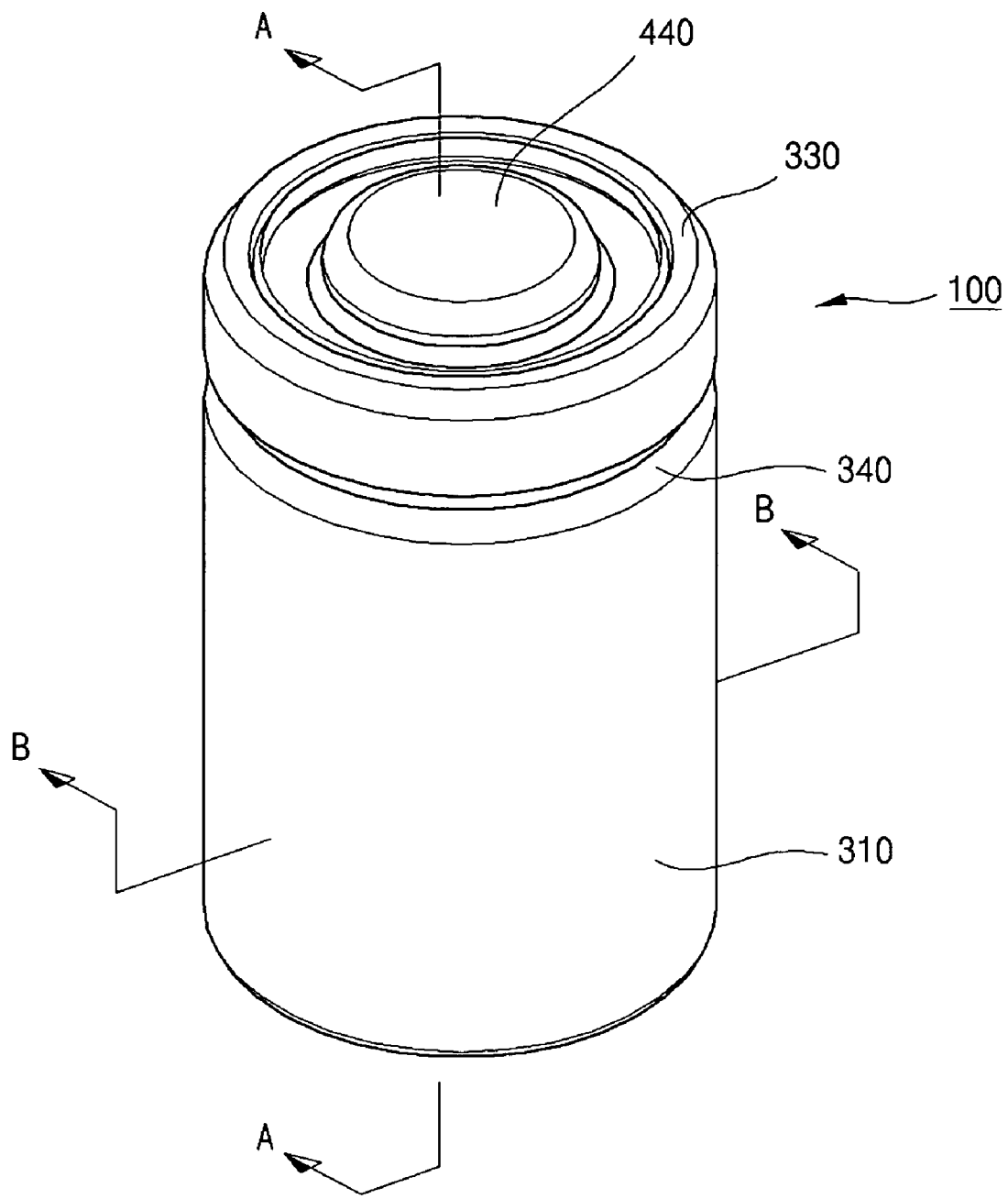
FIG. 1A is a perspective view illustrating a cylindrical lithium rechargeable battery according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1B:
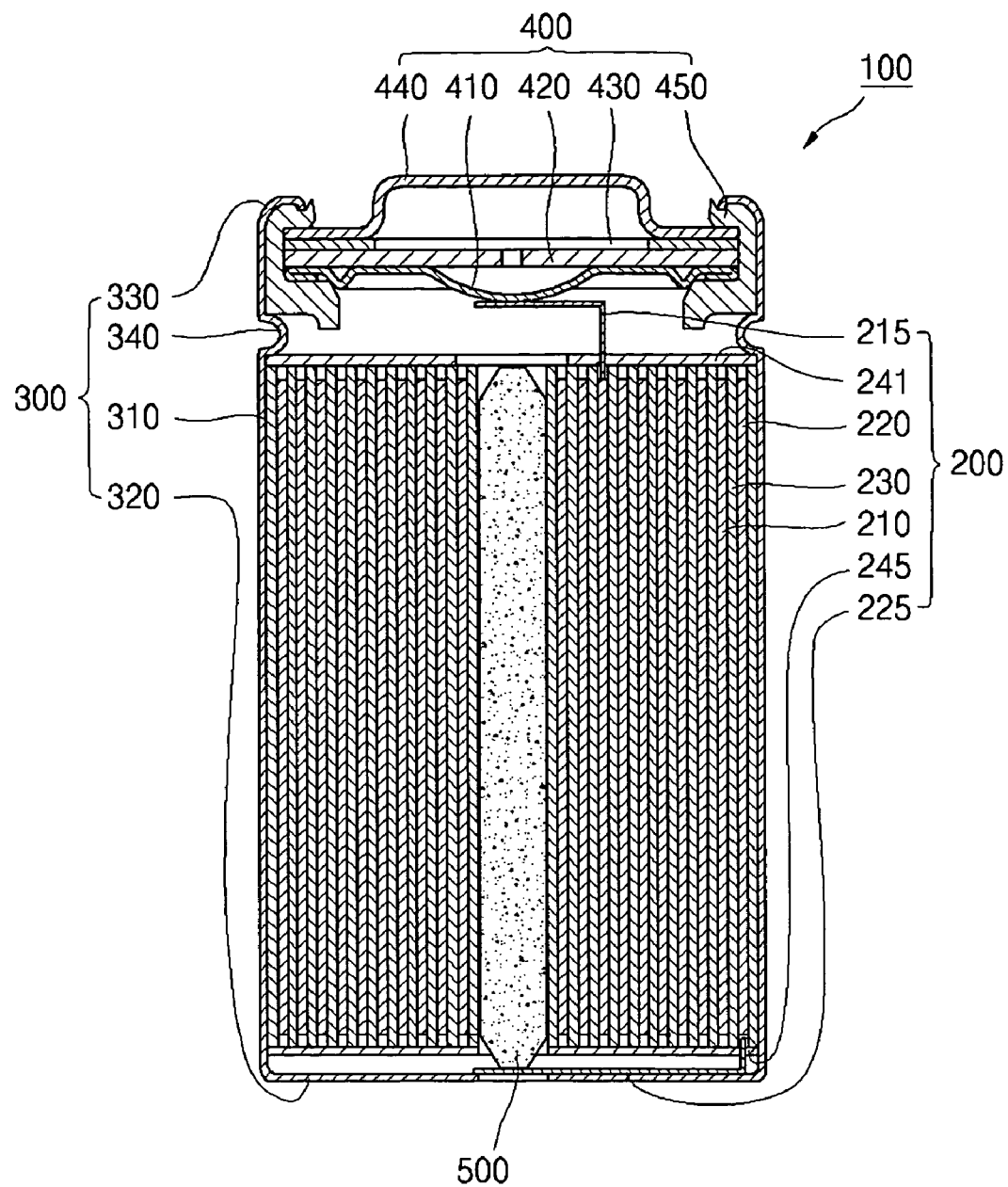
FIG. 1B is a sectional view taken along line A-A of FIG. 1A.
Figure 1C:
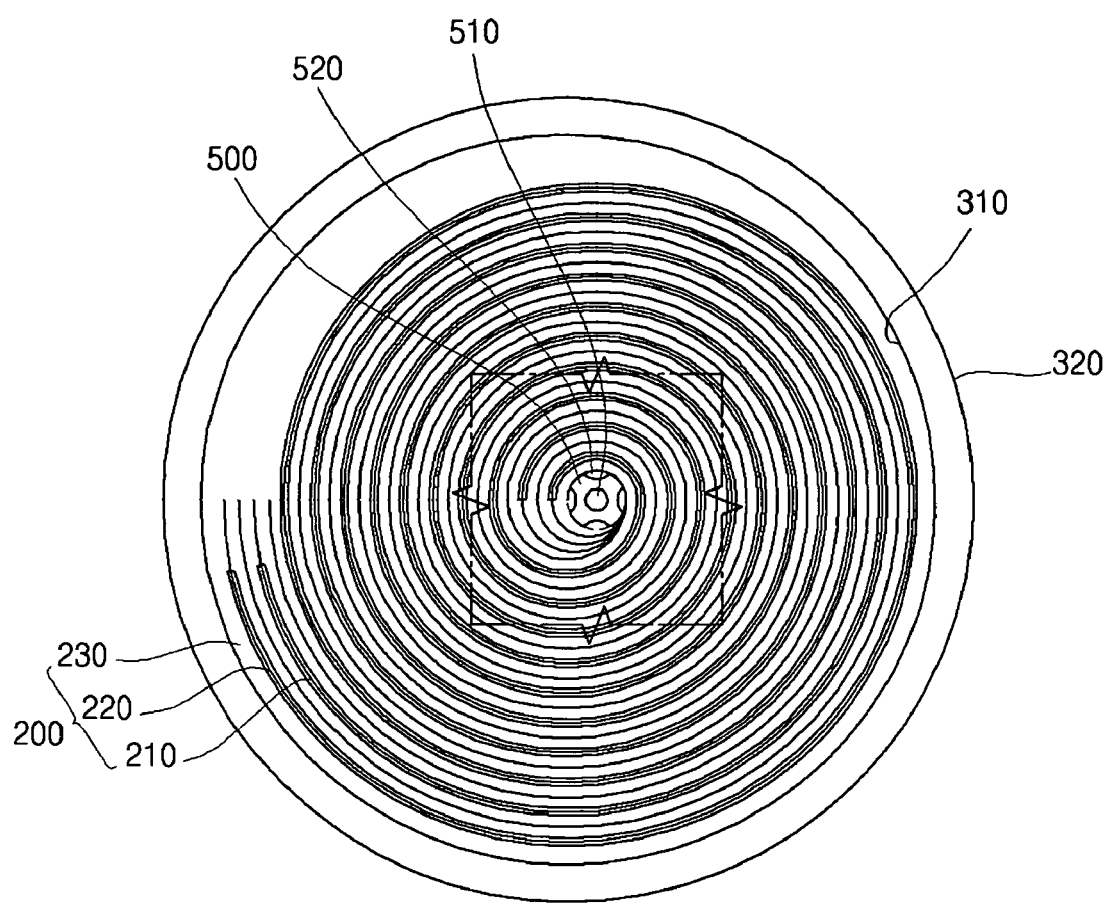
FIG. 1C is a sectional view taken along line B-B of FIG. 1A.

FIG. 1A is a perspective view illustrating a cylindrical lithium rechargeable battery according to an exemplary embodiment of the present invention. FIG. 1B is a sectional view taken along line A-A of FIG. 1A. FIG. 1C is a sectional view taken along line B-B of FIG. 1A.

As shown in FIG. 1A, FIG. 1B, and FIG. 1C, the cylindrical lithium rechargeable battery 100 according to an exemplary embodiment of the present invention may include an electrode assembly 200 for generating a potential difference during charging and discharging operations, a cylindrical case 300 for receiving the electrode assembly 200 therein, a cap assembly 400 coupled with an upper portion of the cylindrical case 300 to prevent the electrode assembly 200 from being separated from the cylindrical case 300, and a core member 500 arranged in a cavity formed at a central portion of the electrode assembly 200.

The electrode assembly 200 may include a first electrode plate 210 coated with a positive electrode active material, a second electrode plate 220 coated with a negative electrode active material, and a separator 230 interposed between the first and second electrode plates 210 and 220 to prevent a short circuit between the first and second electrode plates 210 and 220 while allowing the movement of lithium ions. Alternatively, the first electrode plate 210 may be coated with a negative electrode active material and the second electrode plate 220 may be coated with a positive electrode active material.

The first electrode plate 210, the second electrode plate 220 and the separator 230 may be wound in the form of a cylinder and accommodated in the cylindrical case 300. A first electrode tap 215 may be attached to the first electrode plate 210 and may protrude a predetermined distance upward from the first electrode plate 210. A second electrode tap 225 may be attached to the second electrode plate 220 and may protrude a predetermined distance downward from the second electrode plate 220. The first and second electrode taps 215 and 225 may be made from Al and Ni, respectively, or other materials. In addition, upper and lower insulating plates 241 and 245 may be attached to upper and lower portions of the electrode assembly 200 to prevent the electrode assembly 200 from contacting the cap assembly 400 or the cylindrical case 300.

The cylindrical case 300 may have a cylindrical body 310 with a cavity for receiving the electrode assembly 200. The cylindrical case 300 may include a lower surface 320 sealing a bottom of the cylindrical body 310. An upper surface of the cylindrical body 310 may be open to allow the electrode assembly 200 to be accommodated in the cylindrical case 300. One of the first and second electrode taps 215 and 225 may be coupled with the center of the lower surface 320 of the cylindrical case 300, so that the cylindrical case 300 serves as a negative or positive electrode terminal. The cylindrical case 300 may be made from Al, Fe, or an alloy thereof. The cylindrical case 300 may be provided with a creeping part 330, which is bent in one direction to press the cap assembly 400 downward from the upper portion of the cap assembly 400, and a beading part 340, which is dented to press the cap assembly 400 upward from the lower portion of the cap assembly 400.

The cap assembly 400 may include a conductive safety vent 410, a printed circuit board (PCB) 420, a positive temperature coefficient device 430, a conductive electrode cap 440, and an insulating gasket 450. The first electrode tap 215 may be welded to the conductive safety vent 410. The printed circuit board (PCB) 420 may be electrically and physically coupled with an upper portion of the safety vent 410 so that circuits in the PCB may be disconnected when the safety vent 410 is deformed due to overcharge or abnormal heat generation. The positive temperature coefficient device 430 may be electrically and physically coupled with an upper portion of the PCB 420 so that circuits in the PCB may be disconnected when a temperature rises above a predetermined temperature. The conductive electrode cap 440 may be electrically and physically coupled with an upper portion of the positive temperature coefficient device 430 to apply current to an external device. The insulating gasket 450 may surround lateral portions of the safety vent 410, the PCB 420, the positive temperature coefficient device 430 and the electrode cap 440 to insulate these elements from the cylindrical case 300. The electrode cap 440 may be bonded to one of the first and second electrode taps 215 and 225, so that the electrode cap 440 serves as a positive or negative electrode terminal.

The core member 500 may be inserted into the cavity formed at the center of the wound electrode assembly 200 to prevent the electrode assembly 200 from unwinding or being deformed by external impacts. The core member 500 may have a substantially rod shape.

The core member 500 may be made of synthetic resin, which is softer and lighter than steel use stainless (SUS), such as polyphenylene sulfide (PPS). The core member 500 made of synthetic resin may prevent breakage or deformation of the safety vent 410 of the cap assembly 400 caused by the movement of the core member 500 even if the cylindrical lithium rechargeable battery is compressed or external impact is applied, such as when the cylindrical lithium rechargeable battery falls to the ground. If the safety vent 410 is deformed, a short circuit may occur between the safety vent 410 of the cap assembly 400 and the PCB 420. The core member 500 made of synthetic resin may thus prevent a short circuit.

The core member 500 may include a hole 510 formed lengthwise at a central portion of the core member 500 and at least one groove 520 formed lengthwise at an outer wall of the core member 500.

The height of the core member 500 may be about 90 to 110% of the height of the electrode assembly 200. A lower end of the core member 500 may be arranged on the second electrode tap 225. If the height of the core member 500 is less than about 90% of the height of the electrode assembly 200, the core member 500 may not sufficiently support or fix the electrode assembly 200. On the other hand, if the height of the core member 500 exceeds about 110% of the height of the electrode assembly 200, the core member 500 may make unnecessary contact with elements of the cap assembly 400.

Although it is not illustrated in the figures, an electrolyte may be injected into the cylindrical case 300 to allow lithium ions to move within the electrode assembly 200. The electrolyte may serve as a medium for moving the lithium ions generated at the positive and negative electrodes in the cylindrical lithium rechargeable battery due to the electrochemical reaction during the charging and discharging operations. The electrolyte may include a non-aqueous organic electrolyte that includes a mixture of lithium salts and high purity organic solvent. The electrolyte may include a polymer, such as a polymer electrolyte.

Figure 2A:
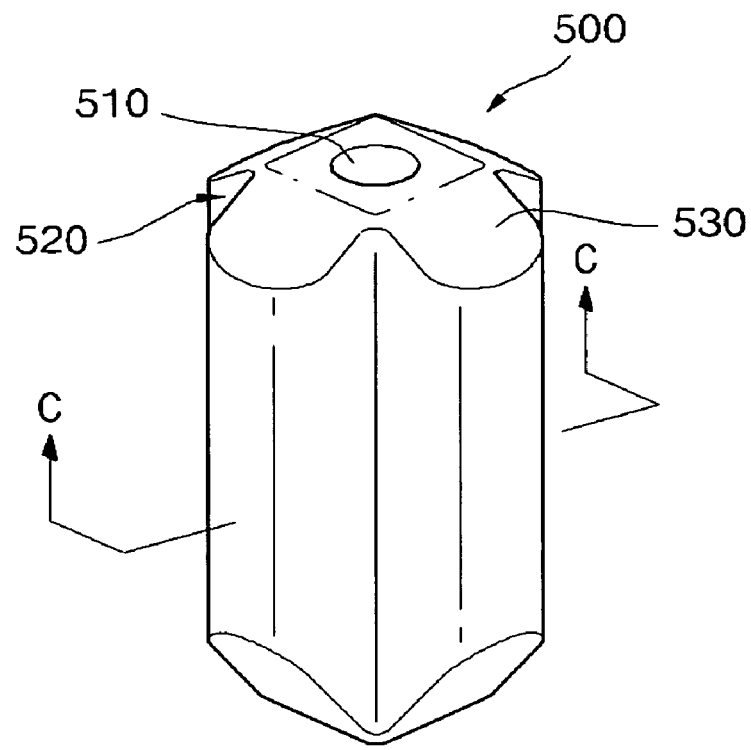
FIG. 2A is a perspective view illustrating a core member of a cylindrical lithium rechargeable battery according to an exemplary embodiment of the present invention.
Figure 2B:
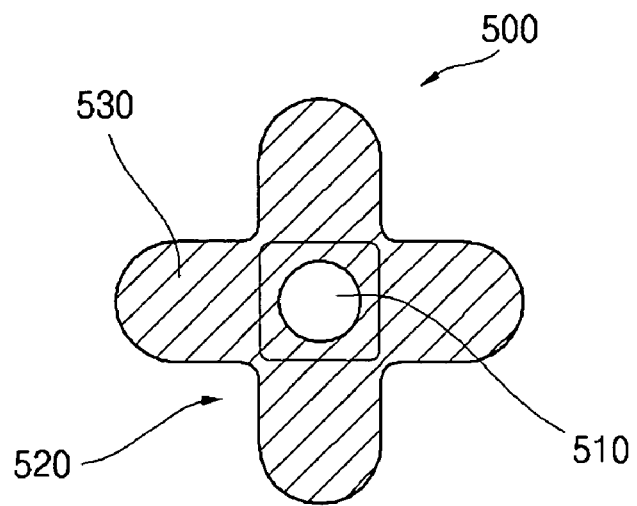
FIG. 2B is a sectional view taken along line C-C of FIG. 2A.

FIG. 2A is a perspective view illustrating the core member of the cylindrical lithium rechargeable battery according to an exemplary embodiment of the present invention. FIG. 2B is a sectional view taken along line C-C of FIG. 2A.

Referring to FIG. 2A and FIG. 2B, the core member 500 of the cylindrical lithium rechargeable battery 100 according to an exemplary embodiment of the present invention may be made of synthetic resin, which is softer and lighter than SUS.

The core member 500 may include a hole 510 formed lengthwise at a central portion of the core member 500 and at least one groove 520 formed lengthwise at the outer wall of the core member 500. The hole 510 and the groove 520 of the core member 500 may allow generated gas to be easily exhausted to the exterior of the cylindrical lithium rechargeable battery during the initial charging and discharging operation.

The core member 500 may include a plurality of wing sections 530 defined by the groove 520.

For example, as shown in FIG. 2A and FIG. 2B, four grooves 520 formed lengthwise at the outer wall of the core member 500 defines four wing sections 530, so that the core member 500 has a cross sectional shape in the shape of a cross.

As shown in FIG. 2A and FIG. 2B, outer walls of the four wing sections 530 of the core member 500 having the cross-type sectional shape may be rounded and upper and lower portions of the wing sections 530 may be chamfered.

The core member 500 inserted into the central portion of the electrode assembly 200 may be exert an influence upon the electrode assembly 200 even if the core member 500 is rotated or deformed due to an external impact, thereby preventing a short circuit in the electrode assembly 200.

Figure 3A:
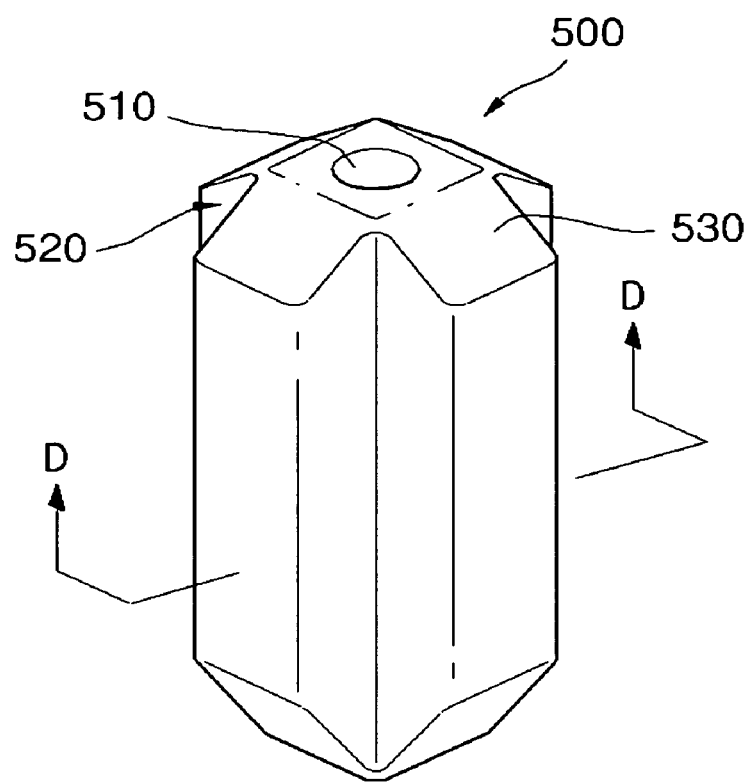
FIG. 3A is a perspective view illustrating a core member of a cylindrical lithium rechargeable battery according to an exemplary embodiment of the present invention.
Figure 3B:
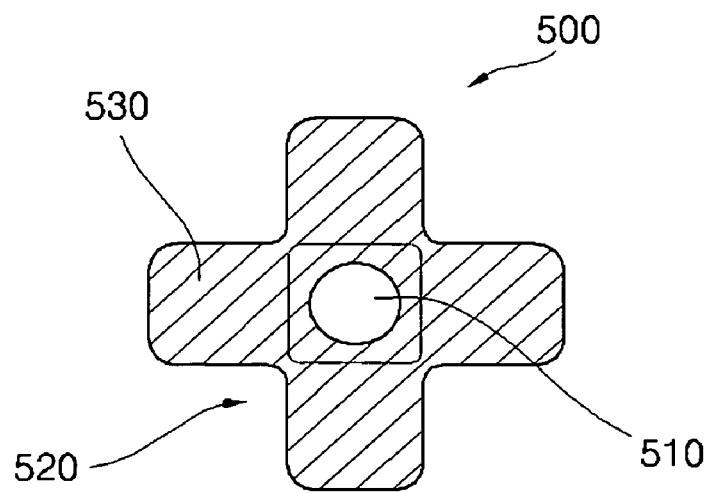
FIG. 3B is a sectional view taken along line D-D of FIG. 3A.

FIG. 3A is a perspective view illustrating a core member of a cylindrical lithium rechargeable battery according to an exemplary embodiment of the present invention. FIG. 3B is a sectional view taken along line D-D of FIG. 3A.

The structure of the core member of the cylindrical lithium rechargeable battery shown in FIG. 3A and FIG. 3B may be substantially similar to the structure of the core member of the cylindrical lithium rechargeable battery shown in FIG. 2A and FIG. 2B, except that the wing sections 530 of the core member according to an exemplary embodiment of the present invention may include rectangular structures with rounded edges in which upper and lower portions of the wing sections 530 are chamfered.

Figure 4:
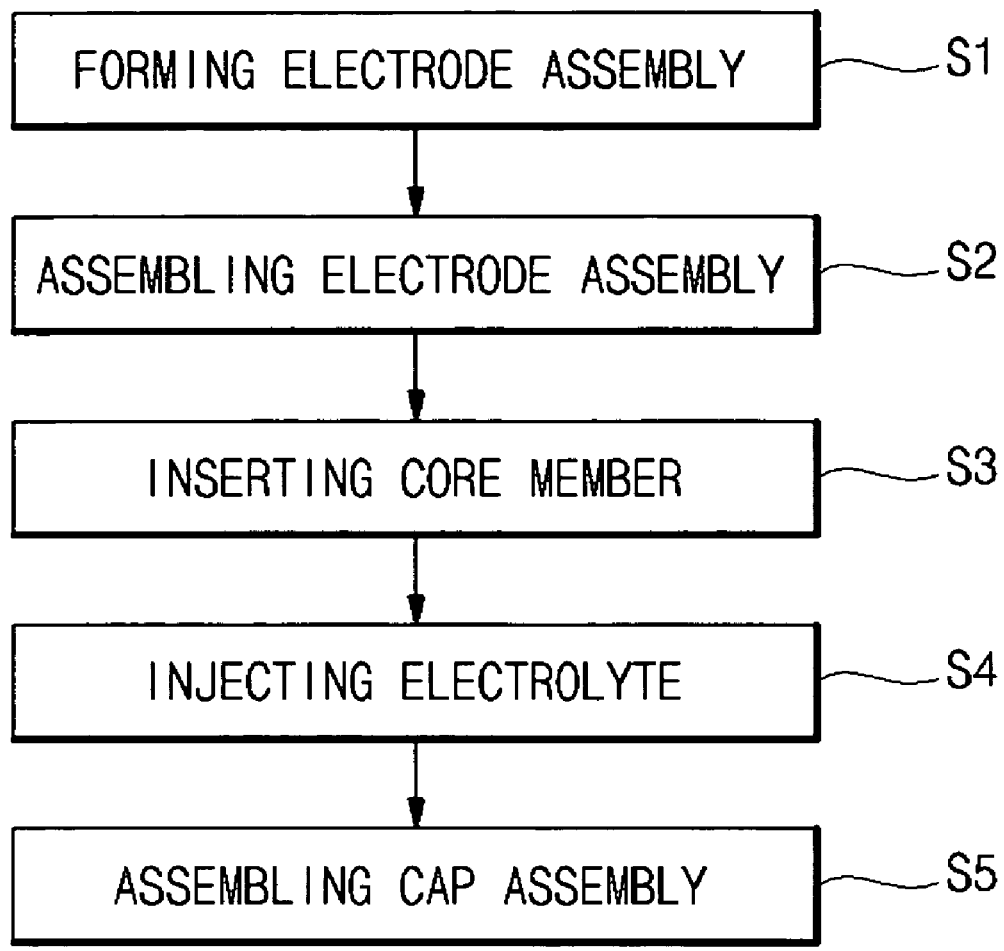
FIG. 4 is a block view of a production method for fabricating a cylindrical lithium rechargeable battery according to an exemplary embodiment of the present invention.

FIG. 4 is a block view of a production method for fabricating the cylindrical lithium rechargeable battery according to an exemplary embodiment of the present invention.

Referring to FIG. 4, the procedure for fabricating the cylindrical lithium rechargeable battery according to an exemplary embodiment of the present invention may include the steps of forming the electrode assembly 200 (S1), assembling the electrode assembly 200 (S2), inserting the core member 500 (S3), injecting the electrolyte (S4), and assembling the cap assembly 400 (S5).

FIG. 5A, FIG. 5B, FIG. 5C, and FIG. 5D are views for explaining a method for fabricating the cylindrical lithium rechargeable battery according to an exemplary embodiment of the present invention. A method for fabricating the cylindrical lithium rechargeable battery according to an exemplary embodiment of the present invention will be described with reference to FIG. 4, FIG. 5A, FIG. 5B, FIG. 5C, and FIG. 5D.

Figure 5A:
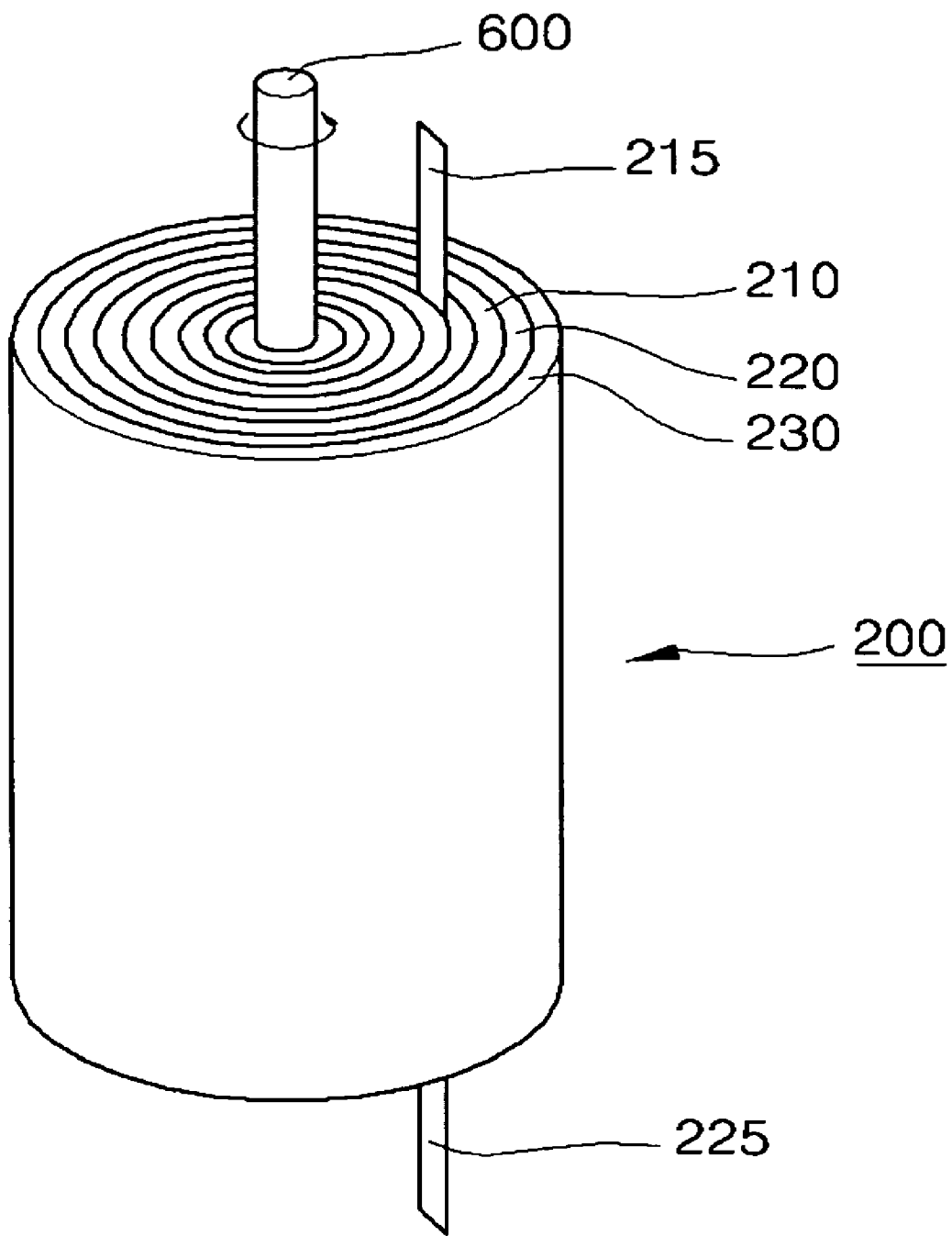
FIG. 5A, FIG. 5B, FIG. 5C, and FIG. 5D are views for explaining a method for fabricating a cylindrical lithium rechargeable battery according to an exemplary embodiment of the present invention.

FIG. 5A illustrates the step of forming the electrode assembly 200 (S1). The first electrode plate 210, the separator 230 and the second electrode plate 220 are sequentially stacked. Then, a winding shaft 600 is coupled to one end of the stacked structure, the first electrode tap 215 is attached to the first electrode plate 210, the second electrode tap 225 is attached to the second electrode plate 220, and the stacked structure is wound in the form of a cylinder to form the electrode assembly 200.

Figure 5B:
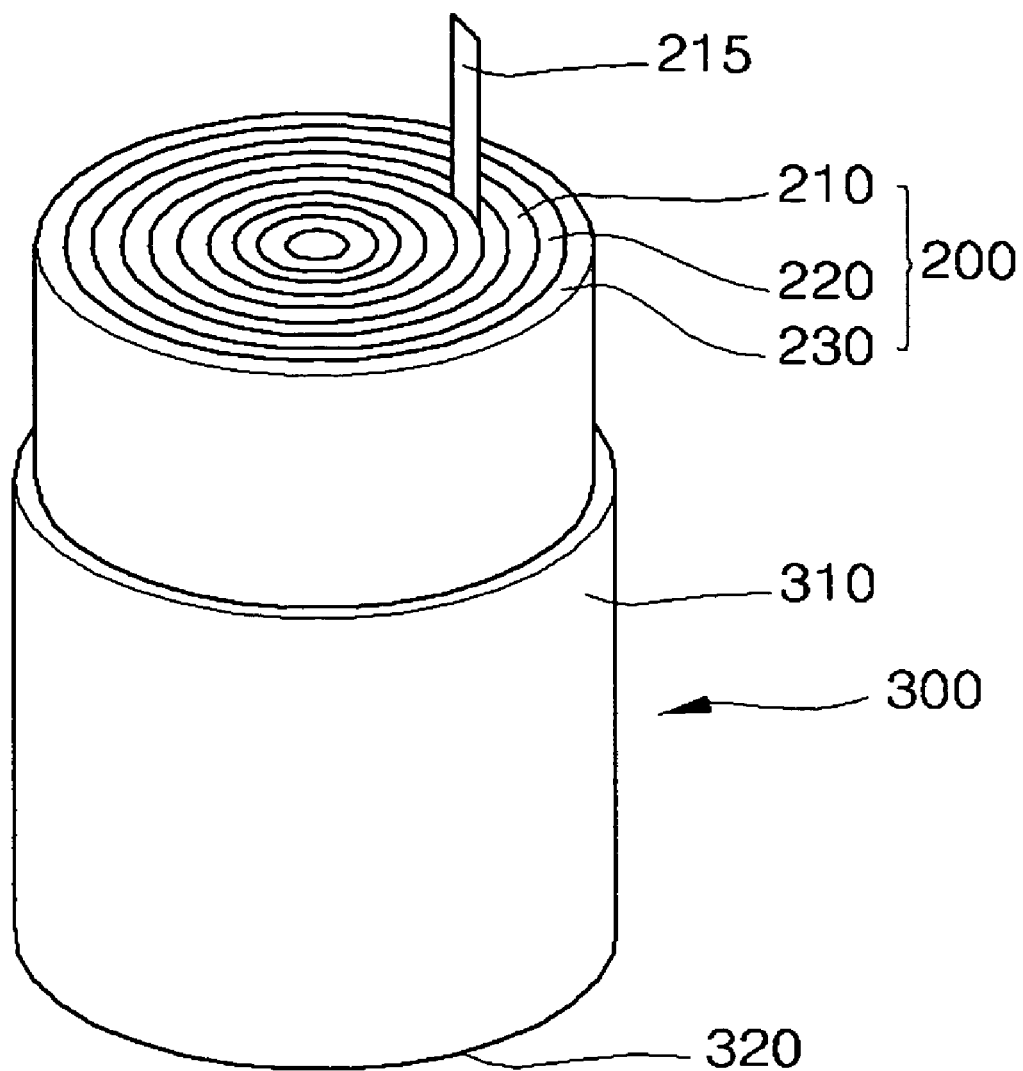

FIG. 5B illustrates the step of assembling the electrode assembly 200 (S2). The electrode assembly 200 is accommodated in the cylindrical case 300. Then, the winding shaft 600 is separated from the electrode assembly 200, thereby forming a cavity having a substantially cylindrical shape at the central portion of the electrode assembly 200. The winding shaft 600 may be separated from the electrode assembly 200 before the electrode assembly 200 is accommodated in the cylindrical case 300. The lower insulating plate 245 is previously coupled to the cylindrical case 300. One of the first and second electrode taps 215 and 225 of the electrode assembly 200 may be attached to the lower surface 320 of the cylindrical case 300 by resistance welding or the like.

Figure 5C:
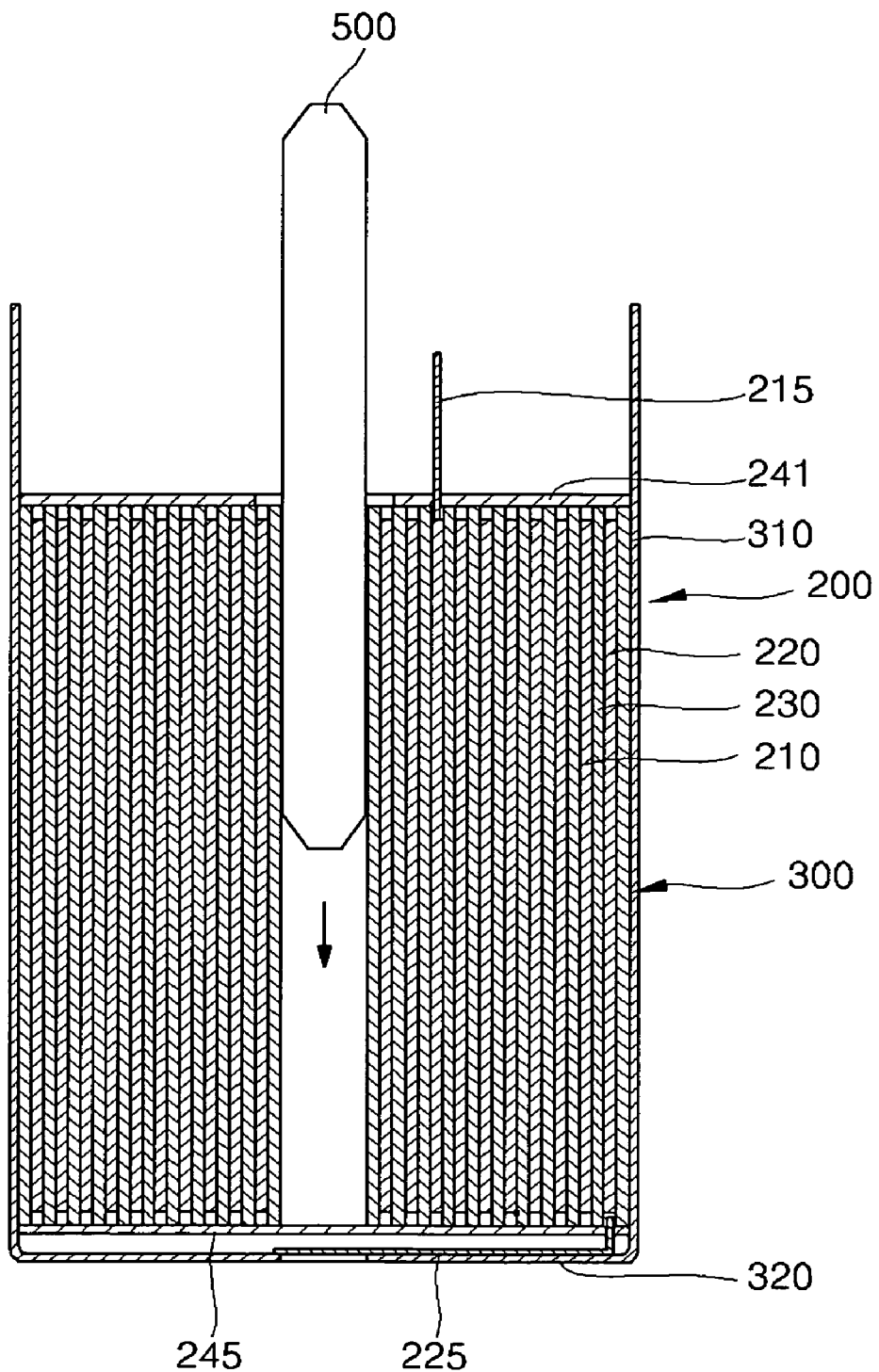

FIG. 5C illustrates the step of inserting the core member 500 (S3). The core member 500 is inserted into the cavity at the central portion of the electrode assembly 200. The core member 500 is positioned on the upper surface of the second electrode tap 225 so that the second electrode tap 225 may be more firmly coupled with the cylindrical case 300 by means of the core member 500.

The step of injecting the electrolyte (S4) is then performed. The electrolyte is injected into the cylindrical case 300 up to the upper end of the electrode assembly 200. The electrolyte serves as a medium for allowing the lithium ions to move between the first and second electrode plates 210 and 220 of the electrode assembly 200 during the charging and discharging operations.

Figure 5D:
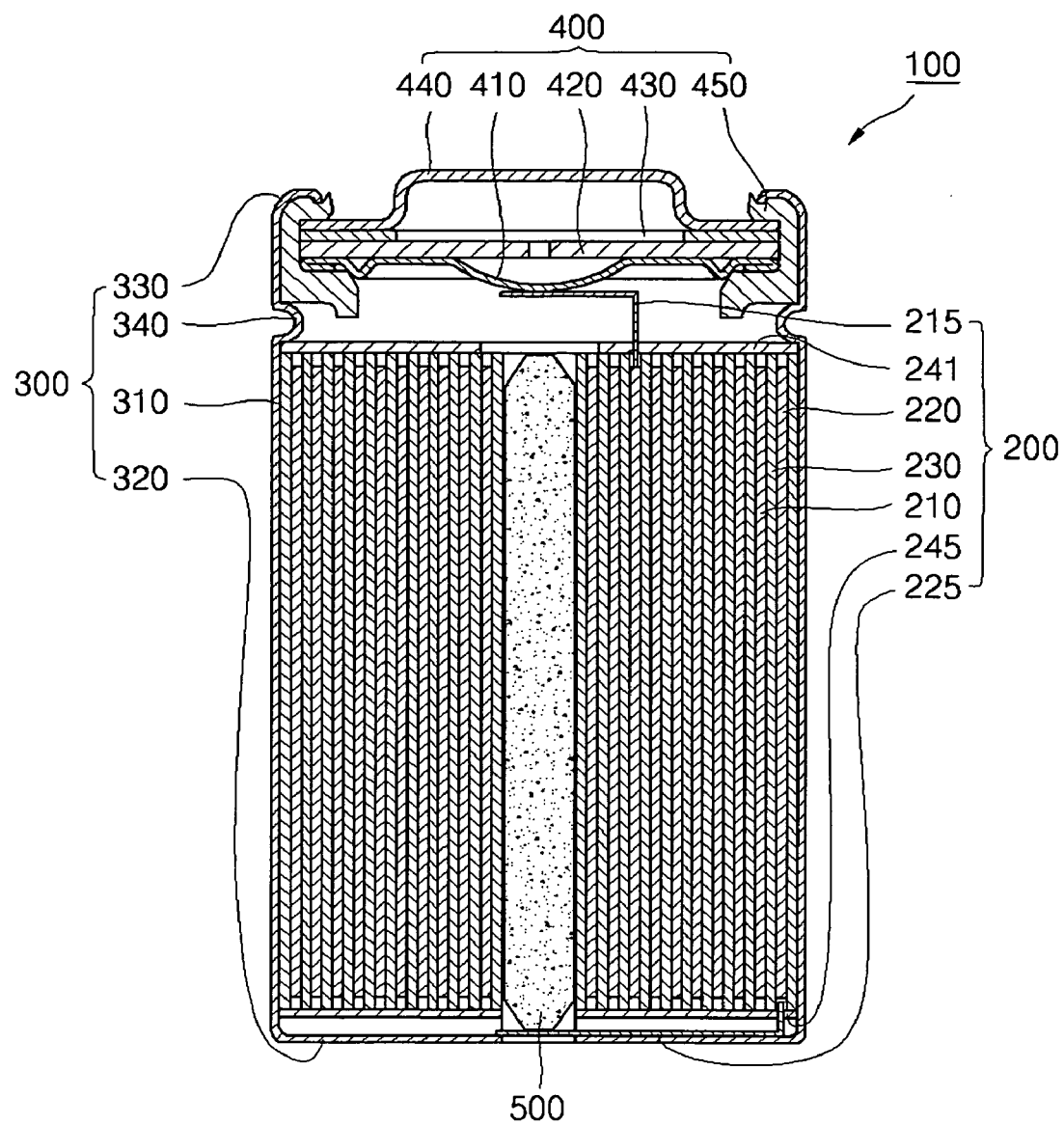

FIG. 5D illustrates the step of assembling the cap assembly 400 (S5). The cap assembly 400 is coupled with the upper portion of the cylindrical case 300 to prevent the electrode assembly 200 and the core member 500 from separating from the cylindrical case 300 and to prevent the electrolyte from leaking from the cylindrical case 300.

An insulating gasket 450 in the form of a ring is coupled with the upper portion of the cylindrical case 300. The conductive safety vent is coupled with one of the first and second electrode taps 215 and 225, and then the conductive safety vent 410, the PCB 420, the positive temperature coefficient device 430, and the electrode cap 440 are sequentially assembled.

The beading part 340 is then formed in the cylindrical case 300 by beading the predetermined portion of the cylindrical case 300 corresponding to the lower end of the insulating gasket 450. The creeping part 330 is formed in the cylindrical case 300 by creeping the upper end portion of the cylindrical case 300 to prevent the cap assembly 400 from separating from the cylindrical case 300. The cylindrical lithium rechargeable battery 100 is then complete.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cylindrical lithium rechargeable battery, comprising:
an electrode assembly comprising a first electrode plate, a second electrode plate, and a separator arranged between the first electrode plate and the second electrode plate, the electrode assembly having a cavity at its central portion;
a core member comprising a plurality of wing sections, the core member being arranged in the cavity, and the core member made of a material that is softer than steel use stainless and that has a specific gravity lower than that of steel use stainless;
a case in which the electrode assembly and the core member are arranged, the case comprising an opening arranged at an upper portion of the case; and
a cap assembly coupled with the upper portion of the case, the cap assembly sealing the case,
wherein the core member is enclosed within the case,
wherein upper and lower end portions of the wing sections are chamfered and spaced apart by a non-chamfered portion,
wherein each wing section is rectangular with two rounded edges on at least a portion where the core member is non-chamfered, the two rounded edges spaced apart from each other by a planar portion on at least the portion where the core member is non-chamfered,
wherein the wing sections are separated by grooves arranged lengthwise along the outer walls of the core member,
wherein each wing section is arranged opposite to a groove, and
wherein the two rounded edges are spaced apart from adjacent grooves.

2. A cylindrical lithium rechargeable battery, comprising:
an electrode assembly comprising a first electrode plate, a second electrode plate, and a separator arranged between the first electrode plate and the second electrode plate, the electrode assembly having a cavity at its central portion;
a core member arranged in the cavity;
a case in which the electrode assembly and the core member are arranged, the case comprising an opening arranged at an upper portion of the case; and
a cap assembly coupled with the upper portion of the case, the cap assembly sealing the case,
wherein the core member is enclosed within the case,
wherein the core member comprises four wing sections arranged so that the core member has a cross sectional shape in the form of a cross, and the core member made of a material that is softer than steel use stainless and that has a specific gravity lower than that of steel use stainless,
wherein upper and lower end portions of the wing sections are chamfered and spaced apart by a non-chamfered portion,
wherein each wing section is rectangular with two rounded edges on at least a portion where the core member is non-chamfered, the two rounded edges spaced apart from each other by a planar portion on at least the portion where the core member is non-chamfered,
wherein each wing section is spaced apart from adjacent wing sections by a groove and the two rounded edges are spaced apart from adjacent grooves.

3. The cylindrical lithium rechargeable battery of claim 2, wherein the core member is made of synthetic resin.

4. The cylindrical lithium rechargeable battery of claim 3, wherein the synthetic resin comprises polyphenylene sulfide.

5. The cylindrical lithium rechargeable battery of claim 2, wherein the core member comprises a hole arranged lengthwise along the core member at a central portion of the core member.

6. The cylindrical lithium rechargeable battery of claim 2, wherein the height of the core member is about 90 to 110% of the height of the electrode assembly.

7. The cylindrical lithium rechargeable battery of claim 2, wherein the each wing section is arranged opposite to another wing section.

8. A cylindrical lithium rechargeable battery, comprising:
an electrode assembly comprising a first electrode plate, a second electrode plate, and a separator arranged between the first electrode plate and the second electrode plate, the electrode assembly having a cavity at its central portion;
a first electrode tap attached to the first electrode plate to protrude upward from the first electrode plate and a second electrode tap attached to the second electrode plate to protrude downward from the second electrode plate;
a core member comprising a plurality of wing sections, the core member being arranged in the cavity, and the core member made of a material that is softer than steel use stainless and that has a specific gravity lower than that of steel use stainless;
a case in which the electrode assembly and the core member are arranged, the case comprising an opening arranged at an upper portion of the case; and
a cap assembly coupled with the upper portion of the case, the cap assembly sealing the case,
wherein the core member is enclosed within the case,
wherein upper and lower end portions of the wing sections are chamfered and spaced apart by a non-chamfered portion,
the core member comprises four wing sections arranged so that the core member has a cross sectional shape in the form of a cross, each wing section being spaced apart from adjacent wing sections by a groove,
the four wing sections are rectangular with two rounded edges respectively on at least a portion where the core member is non-chamfered, the two rounded edges spaced apart from each other by a planar portion on at least the portion where the core member is non-chamfered and the two rounded edges spaced apart from adjacent grooves,
the second electrode tap is coupled with a center of a lower surface of the case, and a lower end of the core member is disposed on the second electrode tap to couple the second electrode tap to the case.

* * * * *